United States Patent [19]

Sumberg

[11] Patent Number: 4,664,181
[45] Date of Patent: May 12, 1987

[54] PROTECTION OF HEAT PIPES FROM FREEZE DAMAGE

[75] Inventor: Andrew J. Sumberg, Arlington, Mass.

[73] Assignee: Thermo Electron Corporation, Waltham, Mass.

[21] Appl. No.: 811,990

[22] Filed: Dec. 23, 1985

Related U.S. Application Data

[63] Continuation of Ser. No. 586,170, Mar. 5, 1984, abandoned.

[51] Int. Cl.⁴ .................. F28D 15/00; F28F 23/02
[52] U.S. Cl. .......................... 165/104.13; 165/134.1; 252/70; 252/71
[58] Field of Search ............. 165/104.13, 134.1; 252/70, 71

[56] References Cited

U.S. PATENT DOCUMENTS 3,079,087 2/1963 Herrick et al. ............. 165/104.13
3,777,811 12/1973 Shcosinger ................. 165/104.13
4,106,554 8/1978 Arcella ..................... 165/104.13

FOREIGN PATENT DOCUMENTS 818281 8/1959 United Kingdom ........... 165/104.13

OTHER PUBLICATIONS

Bennett, H., The Chemical Formulary, vol. 2, pp. 480-481, 1935.

Primary Examiner—Albert W. Davis, Jr.
Attorney, Agent, or Firm—Herbert E. Messenger

[57] ABSTRACT

Disclosed is a heat pipe which is protected from damage due to freezing by the addition of small amount of a liquid such as an alcohol to its working fluid. Ethanol/water mixtures having ethanol concentrations from about 1 to 7.5 percent by volume are found to produce a relatively weak crystal solid during freezing in a heat pipe so that the weak solid breaks up and expands without rupturing a wall or joint of the heat pipe. Heat transfer and operating characteristics of the heat pipe are not degraded due to the presence of specified amounts of the additive.

7 Claims, 4 Drawing Figures

PROTECTION OF HEAT PIPES FROM FREEZE DAMAGE

This application is a continuation of application Ser. No. 586,170 filed Mar. 5, 1984, now abandoned.

BACKGROUND OF THE INVENTION

This invention relates to heat exchangers and more particularly to the protection of heat exchangers such as heat pipes from damage resulting from freezing of a working fluid within the heat exchanger.

A potential problem with heat exchangers such as heat pipes is structural damage to the heat pipe caused by freezing of its working fluid, particularly when water is employed as the working fluid. In appliances using a heat pipe this can occur in cold weather during storage or transport of the appliance. It can also occur after installation if the appliance is subjected to freezing conditions—e.g., because of power or mechanical failure. Such freezing can lead to the rupture of a wall or joint of the heat pipe and to failure of the heat pipe.

One known method of avoiding damage is to prevent freezing of the working fluid by adding to it sufficient amounts of anti-freeze agents. For example, when water is used as a working fluid, ethylene glycol may be added to depress the freezing point of the working fluid. However, the large amounts of anti-freeze agents required to prevent freezing (e.g., up to about 50 percent by volume to depress the freezing point of water to minus 30° F.) produces a mixture whose characteristics differ substantially from those of the working fluid. This can result in altered performance and reduced heat transfer by the heat pipe. Moreover, anti-freeze agents may be expensive when required in large quantities.

Other approaches permit freezing but rely on special wicks or provide expansion relief within the vessel containing a working fluid. The "special wick" approach is illustrated in U.S. Pat. No. 4,194,559, which describes a heat pipe with a high capillary lift wick capable of holding all of a limited inventory of working fluid in the heat pipe. Expansion relief techniques are disclosed in U.S. Pat. Nos. 4,321,908 and 4,227,512 which suggest the use of compressible tubes within conduits or the headers of solar water heaters. Another patent, U.S. Pat. No. 4,248,295, describes a freezable heat pipe containing a free-standing, porous structure whose length exceeds the depth of liquid in the heat pipe. Drawbacks to these approaches include the design restrictions they require and the undesirably large amount of space occupied by expansion relief structures. Moreover, such structures may be difficult to utilize in heat pipes having complex geometry.

Accordingly, it is an object of the invention to provide an improved method of protecting heat exchangers from damage due to freezing.

It is an object of the invention to provide a heat pipe capable of surviving freezing and thawing cycles.

It is an object of the invention to provide a heat pipe partially filled with a working fluid whose freeze characteristics permit freezing of the fluid without rupture of the heat pipe.

It is an object of the invention to provide a method for modifying the freeze characteristics of the working fluid of a heat pipe to prevent damage due to freezing without degrading performance of the heat pipe.

SUMMARY OF THE INVENTION

The invention concerns heat pipes which are capable of withstanding freezing of their working fluid without rupture or structural failure, and a method of protecting heat pipes from freeze damage.

According to the invention a heat pipe partially filled with a working fluid such as water is modified by the addition to the working fluid of small amounts of an additive fluid such as ethyl alcohol, butyl alcohol, or propyl alcohol. The mixture of working fluid and up to about ten percent by volume of additive fluid, when subjected to low temperatures, freezes in a manner such that weaker crystalline bonds are formed than are produced during freezing of the working fluid alone. Instead of expanding as a solid plug which could damage the wall or casing of the heat pipe, the relatively weak crystal solid breaks up and expands within the heat pipe without rupturing a wall or joint of the heat pipe.

An important aspect of the invention is that the additive fluids specified are effective to prevent freeze failures when used in relatively small amounts, i.e., less than about ten percent by volume of the fluid mixture and as low as 1-2 percent by volume. When such amounts are used the heat transfer and other performance characteristics of heat pipes are not degraded due to the presence of the additive fluid.

DETAILED DESCRIPTION OF PREFERRED EMBODIMENTS

Figure 2:
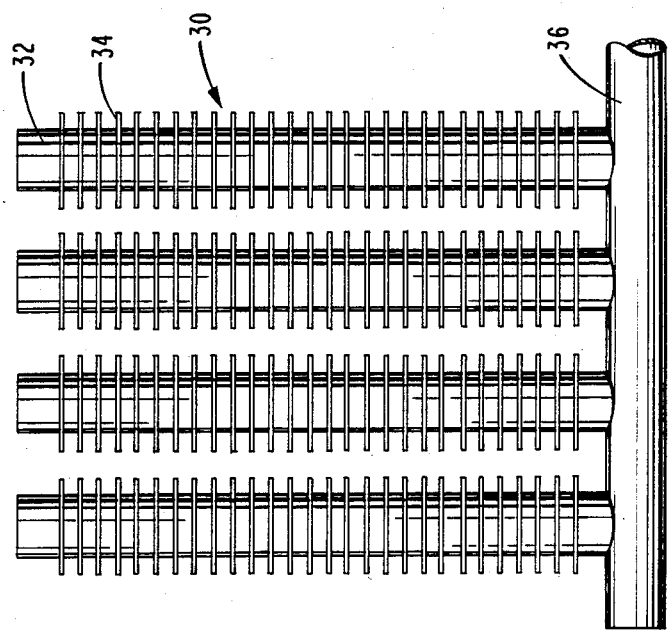
FIG. 2 is an elevational view of a manifold and finned tube arrangement used in freeze cycle tests of the invention

The present invention provides freeze protection not by preventing freezing of the working fluid held by a heat pipe or other heat exchanger but by modifying the working fluid such that in freezing it does not rupture or crack the heat pipe. The working fluid, preferably water (although the principles of the invention are considered applicable to other working fluids), is combined with small amounts of a selected additive fluid to form a mixture which partially fills a heat pipe. As the mixture freezes, weak crystal bonds are formed. The resulting weak solid expands to occupy some of the heat pipe space not filled by the mixture rather than developing high internal forces which could rupture the wall or a joint of the heat pipe.

Important considerations in selection of the additive liquid employed in the invention are that the additive be miscible with the working fluid, be thermally stable, that it not significantly alter the working fluid heat transfer characteristics, and that it not promote corrosion of heat pipe materials. It is desirable that the additive liquid have a boiling point reasonably close to that of the working fluid so that high vapor concentrations of the additive are not produced during operation of the heat pipe, which could adversely affect operating characteristics and performance of the heat pipe. Also, non-toxic additives are preferred, and may be required in applications wherein heat pipes are employed to transfer heat to potable water.

A preferred additive fluid when the heat pipe working fluid is water is ethyl alcohol (ethanol), which is non-toxic, inexpensive, and has thermophysical properties compatible with water. Other candidate fluids include alcohols such as propyl alcohol, butyl alcohol, methyl alcohol, ethylene glycol, and glycerol. Butyl alcohol (butanol) and propyl alcohol (propanol) offer the possible advantage over ethanol that greater quantities of them may likely be used without adversely affecting operation and performance of a heat pipe. This is so because the boiling points of butanol and propanol are closer (than is ethanol) to the boiling point of water and hence greater liquid concentrations of them in water are required to produce the same concentration in the vapor generated during operation of a heat pipe. Certain organic acids may also be suitable additive fluids provided they are sufficiently stable for the specific heat pipe applications intended.

Small concentrations of additive fluid are preferred in the protection of heat pipe against freeze damage according to the invention. One reason for this is that since the invention is not intended to prevent freezing, large concentrations are an unnecessary expense. Moreover, the use of amounts of additive fluid in excess of about 8-10 percent by volume of the mixture of water and additive adversely affects performance of a heat pipe such that heat transfer is reduced and higher working pressures are required. Large concentrations of additive fluid may also interfere with operation of the heat pipe by rendering start-up more difficult and increasing risk of heat pipe burnout. Small amounts of additive fluids, on the other hand, have been found capable of producing the altered crystal structure desirable for preventing damage. For example, ethyl alcohol in amounts as low as about one percent by volume of a water/ethyl alcohol mixture has successfully prevented damage to a heat pipe appliance subjected to freezing temperatures. A preferred concentration of ethyl alcohol is in the range of about 2 to about 5 percent.

Figure 1:
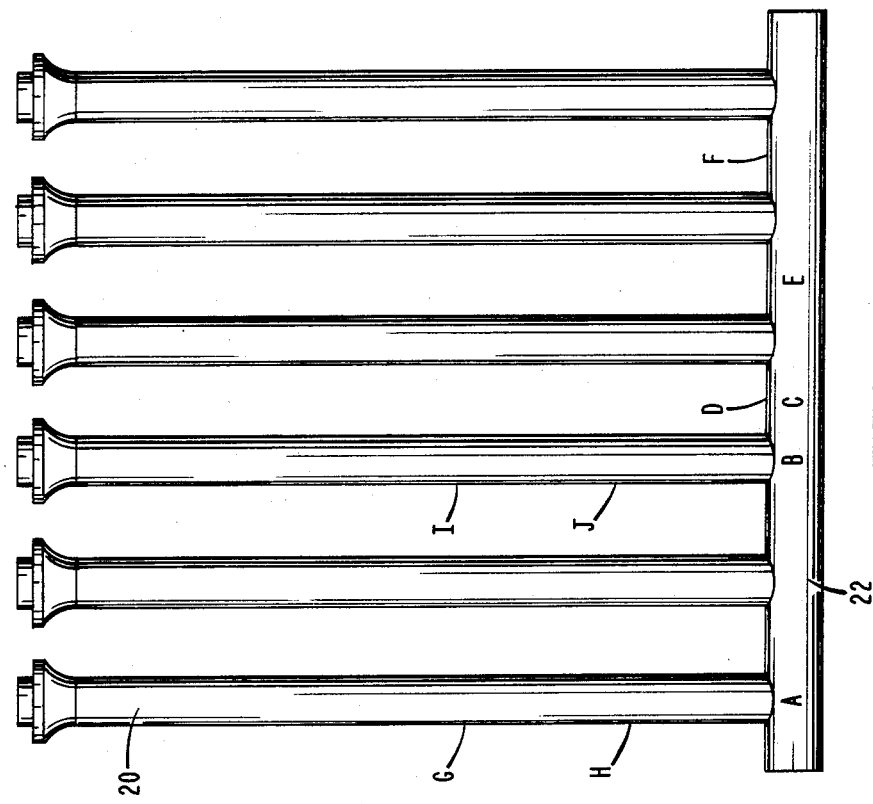
FIG. 1 is an elevational view of a manifold and tube arrangement used in freeze cycle tests of the invention.

To verify the principles of the invehtion, freeze tests were performed on a manifold-pipe heat exchanger (FIG. 1 ) resembling a heat pipe and containing a solution of water and 0,2,3,4,5, or 6 percent by volume of ethyl alcohol (U.S.I. pure ethyl alcohol dehydrated U.S.P.). The heat exchanger included six copper tubes 20 having approximate dimensions as follows: length—9¼ inches, outer diameter—⅜ inch, and inner diameter—9/16 inch. The tubes 20 were silver-brazed to a copper manifold 22 having a length of about 9⅜ inches, an outer diameter of about 0.875 inches, and an inner diameter of about 0.81 inches. Two hundred and twenty-seven milliliters of a solution of ethyl alcohol (ethanol) and water was added to the heat exchanger, filling it to about three-quarters height. Vacuum was then applied and the apparatus was sealed. The heat exchanger thereafter was subjected to a freeze test including nine freeze cycles to a selected temperature ($+25°$ F., $-10°$ F., and $-40°$ F.) by immersion into a solution of cooled ethylene glycol. Expansion of the tubes 20 and the manifold 22 was measured at locations indicated by the letters shown in FIG. 1 to determine possible freeze damage. When two heat exchangers were freeze-cycled with water only (0 percent ethyl alcohol) the manifold 22 of one expanded significantly at temperatures of $-10°$ F. and $-40°$ F., almost to the point of rupture. At $-10°$ F., position D expanded by 0.009 inch and position F by 0.008 inch; at $-40°$ F., D expanded 0.0085 inch and F by 0.005 inch. No measurable expansion occurred at temperatures of $+25°$ F., $-10°$ F., and $-40°$ F. in similar heat exchangers tested with ethanol/water solutions containing from 2 to 6 percent ethanol.

A modified heat exchanger 30 whose tubes 32 included extruded copper fins 34 (FIG. 2) was freeze-tested at $-15°$ F. and measurements of its manifold 36 were made to detect expansion. With the heat exchanger partially filled with water and about two percent by volume of ethanol, no significant expansion was noted during eight "slow-freeze" cycles conducted over a period of thirteen days (slow-freezing consisted of cooling the heat exchanger in a freezer chest). However, after the heat exchanger 30 was drained and filled with pure water to the same level as the previous test, it split open on the first "freeze" to $-15°$ F.

Figure 3:
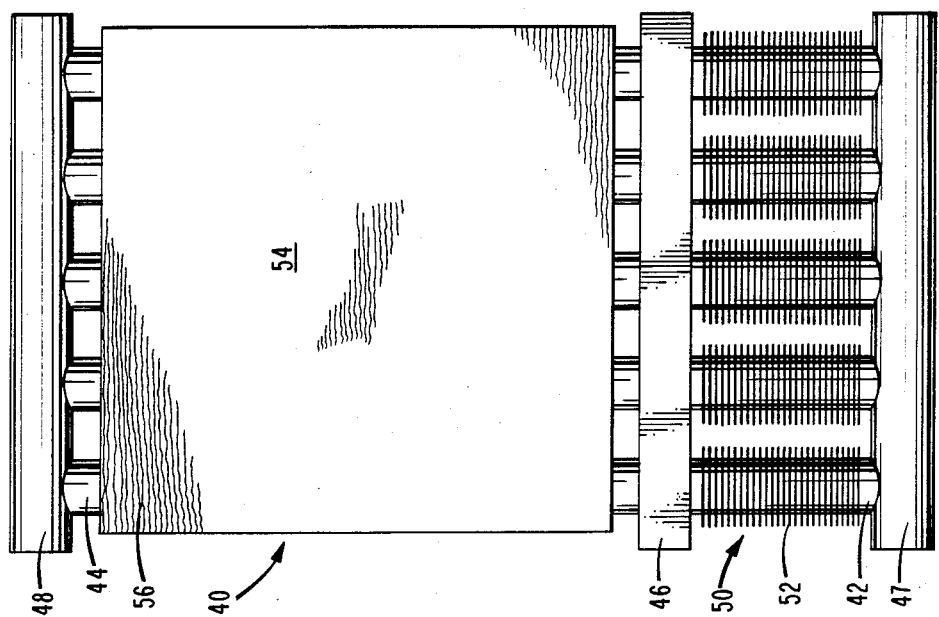
FIG. 3 is an elevational view of an embodiment of a heat pipe according to the invention.

Freeze tests were also conducted on a wickless heat pipe illustrated in FIG. 3. This heat pipe included two interconnected sets of copper tubes 42 and 44 each having one end extending into a coupling plate 46 and their other ends connected respectively to a bottom manifold 47 and a top manifold 48. The tubes 42 of the heat pipe evaporator 50 included extruded 1.5-inch diameter fins 52 (nine fins per inch), while the tubes of the condenser 54 were fitted with plate-type fins 56.

In one test, the heat pipe 40 was charged with a solution of 750 milliliters of deionized water and 20 milliliters of ethyl alcohol (2.6 percent by volume of ethyl alcohol), which filled the evaporator 50 and extended upward about one inch into the tubes 44 of the condenser. The heat pipe was then placed in a freezer with temperatures of about 0° F., removed after about 22 hours for thawing and careful examination, then placed back in the freezer for another cycle.

With the exception of repair of a leak to a defective pinch-off at the bottom manifold 47 at the third freezing cycle and repair of a small pre-existing leak in the top manifold 48 after the sixth freezing cycle, no repairs were needed on the heat pipe 40 during fifty freeze cycles to which it was subjected. At the fortieth freeze cycle a cap in one end of the bottom manifold 47 bulged by about ¼ inch, but the heat pipe 40 continued to hold vacuum even after ten additional cycles.

Fourteen prototype furnaces incorporating a heat pipe heat exchanger of this general design and charged with water plus 2.7% ethyl alcohol as the working fluid were shipped for field testing to various locations including Minnesota and Michigan during a period of freezing weather. All arrived in good condition. One furnace shipped to Toronto, Canada, did not have any alcohol added to the water working fluid. Its heat pipe ruptured.

Short-term performance tests were also conducted on the heat pipe 40 to determine the effect of alcohol concentration on its operating and performance characteristics. In these tests the ethyl alcohol concentration in the heat pipe was varied from 2.5 percent to about 20 percent by volume, and the evaporator 50 was exposed to a flow of hot gases at a fuel firing rate of about 100,000 BTU/hour. The $CO_2$ content of the exhaust gases was 9.5 percent. During the tests the heat pipe pressure, the heat pipe evaporator and condenser temperatures, and the flue (exhaust gas) temperature were monitored.

Figure 4:
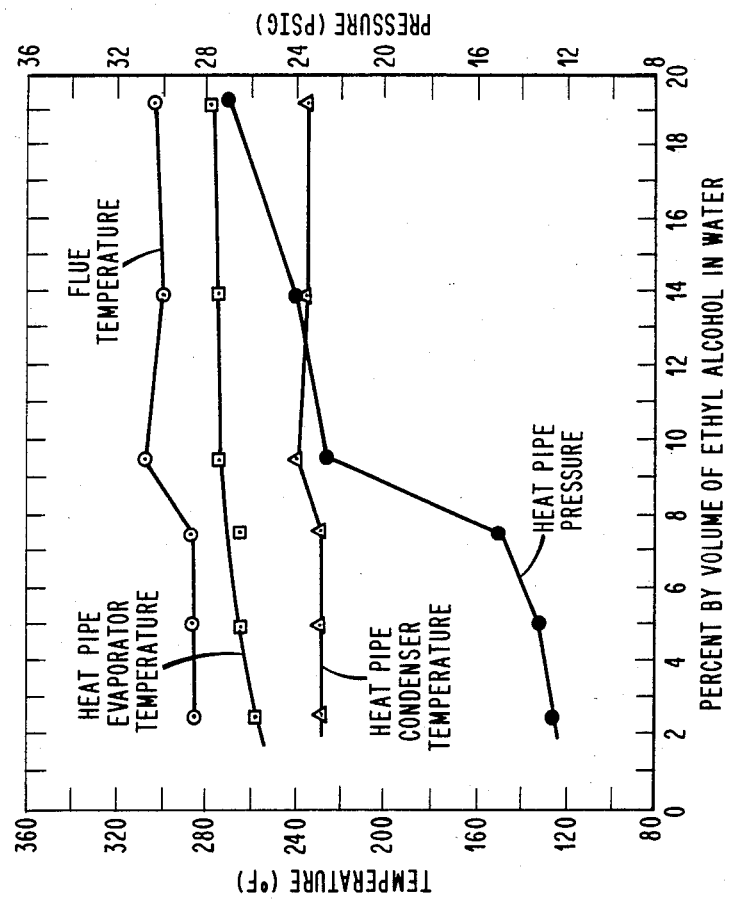
FIG. 4 is a graph of results of performance tests conducted on the heat pipe illustrated in FIG. 3 and containing different amounts of ethyl alcohol in water.

As shown in the test results plotted in FIG. 4, only small changes in measured heat pipe performance occurred up to an ethyl alcohol concentration of about 7.5 percent by volume. Above 7.5 percent alcohol, measured heat pipe pressure rose substantially and this was accompanied by a noticeable observed noise during operation of the heat pipe. The noise is believed to be an indication of uneven operation of the working fluid within the heat pipe tubes. Also, the flue temperature increased from a value of 285° F. for ethyl alcohol concentrations below 7.5 percent to 307° F. at about 9.5 percent alcohol, indicating a drop in heat transfer by the heat pipe for ethyl alcohol content above 7.5 percent.

Thus, it may be concluded that the heat pipe 40 shown in FIG. 3 can be operated with up to about 7½ percent ethyl alcohol in water without suffering any appreciable degradation in performance or operating characteristics.

It is to be understood that the forms of the invention shown and described herein are merely preferred embodiments. Other heat pipe systems, such as single-tube heat pipes with (or without) wicks or fins, may be protected from freeze damage without departing from the spirit or scope of the invention, and the invention is defined as all embodiments and their equivalents within the scope of the following claims.

What is claimed is:

1. In a heat pipe having a casing defining an evaporator and a condenser and having water sealed in and partially filling the casing as a heat exchange working fluid, said casing being readily damageable upon the freezing of said water at temperatures at or below about −15° F., the improvement comprising an additive fluid sealed in said casing with said water to form a mixture, said additive fluid being an alcohol which in liqid form makes up from about one to about twn percent by volume of said mixture; said mixture having freezing characteristics such that damage to the casing is avoided at temperatures as low as about −40° F. even though freezing of said mixture occurs, and said alcohol having the further effect that the heat transfer and working pressure characteristics of said mixture are substantially the same as those of water alone during operation of said heat pipe.

2. A heat pipe as in claim 1 wherein said alcohol is selected from the group consisting of ethanol, ethylene glycol, glycerol, and mixtures thereof.

3. A heat pipe as in claim 1 wherein said alcohol is selected from the group consisting of butanol, propanol, and mixtures thereof.

4. A heat pipe as in claim 1 wherein said alcohol is ethanol in an amount of between about one percent and seven and one half percent by volume of said mixture in liqid form.

5. A heat pipe according to claim 1 wherein, said casing comprises a bottom manifold, a top manifold, and a plurality of tubes extending between, and in fluid communication with, said manifolds.

6. A method of preventing damage to a heat pipe adapted for use as a heat exchanger, said heat pipe including a casing withwater as a working fluid sealed therein and partially filling siad casing, said casing having a structure which would be damaged by freezing of said water upon exposure of said heat pipe to temperatures at or below about −15° F., comprising mixing an alcohol with said water to form a mixture containing, when in liquid form, between about one and about ten percent by volume of said Alcohol, the amount and identity of said alcohol being selected such that said mixture provides, during operation of said heat pipe, heat transfer and working pressure characteristics similar to those of water alone, and said mixture forms sufficiently weak structural bonds during freezing at temperatures as low as about −40° F. to permit expansion of said mixture without damage to said casing.

7. A method as in claim 6 wherein said alcohol is ethanol in an amount between about one percent and seven and one half percent by volume of said mixture in liquid form.

* * * * *